United States Patent
Kojo

(10) Patent No.: US 7,366,162 B2
(45) Date of Patent: Apr. 29, 2008

(54) RECEPTION APPARATUS AND RECEPTION METHOD

(75) Inventor: Tomomasa Kojo, Tokyo (JP)

(73) Assignee: Sony Corporation, Tokyo (JP)

( * ) Notice: Subject to any disclaimer, the term of this patent is extended or adjusted under 35 U.S.C. 154(b) by 851 days.

(21) Appl. No.: 10/477,887

(22) PCT Filed: Mar. 14, 2003

(86) PCT No.: PCT/JP03/03111

§ 371 (c)(1),
(2), (4) Date: Nov. 19, 2003

(87) PCT Pub. No.: WO03/079640

PCT Pub. Date: Sep. 25, 2003

(65) Prior Publication Data
US 2005/0041672 A1    Feb. 24, 2005

(30) Foreign Application Priority Data
Mar. 19, 2002    (JP) ............................. 2002-075979

(51) Int. Cl.
*H04L 12/66* (2006.01)
(52) U.S. Cl. ...................... 370/352; 370/493; 370/522

(58) Field of Classification Search ................ 370/465, 370/389, 506, 704, 352–356, 493, 395.1, 370/396, 536–542, 544, 466, 476, 522
See application file for complete search history.

(56) References Cited

U.S. PATENT DOCUMENTS

| 6,904,403 | B1 * | 6/2005 | Muraki et al. ............... 704/212 |
| 7,130,906 | B2 * | 10/2006 | Miyoshi et al. ............. 709/225 |
| 2004/0033057 | A1 * | 2/2004 | Kojo et al. ................. 386/111 |

FOREIGN PATENT DOCUMENTS

JP    2001-250318 A    9/2001

* cited by examiner

*Primary Examiner*—Ajit Patel
(74) *Attorney, Agent, or Firm*—Wolf, Greenfield & Sacks, P.C.

(57) ABSTRACT

A multiformat-compatible receiving apparatus is quickly compatible with a change in the signal type of a received signal.

Responsive to the detection of a stream change to an invalid data stream (ancillary no data), a signal processing means is controlled to have a setting compatible with the signal type of the invalid data stream (F104→F105). Thus, the setting of the signal processing means is predictively changed so as to be compatible with the signal type of real data to arrive next. When a stream change to a real data stream is actually detected, a receiving means is controlled to have a setting compatible with the signal type of the real data stream (F107).

2 Claims, 8 Drawing Sheets

FIG. 3A

| | 0 | 1 | 2 | 3 (BYTE) |
|---|---|---|---|---|
| q1 | 0x | L-CHANNEL AUDIO DATA | | |
| q2 | 0x | R-CHANNEL AUDIO DATA | | |

AUDIO LABEL

FIG. 3B

| | 0 | 1 | 2 | 3 |
|---|---|---|---|---|
| q1 | 0xCF | 0x00 | NO DATA | |
| q2 | 0xCF | 0x00 | NO DATA | |

AUDIO LABEL

FIG. 3C

| | 0 | 1 | 2 | 3 (BYTE) |
|---|---|---|---|---|
| q1 | 0xD0 | 0x01 | ANCILLARY DATA | |
| q2 | 0xD0 | 0x02 | ANCILLARY DATA | |
| q3 | 0x48 | CHANNEL 1 AUDIO DATA | | |
| q4 | 0x48 | CHANNEL 2 AUDIO DATA | | |
| q5 | 0x48 | CHANNEL 3 AUDIO DATA | | |
| q6 | 0x48 | CHANNEL 4 AUDIO DATA | | |
| q7 | 0x48 | CHANNEL 5 AUDIO DATA | | |
| q8 | 0x48 | CHANNEL 6 AUDIO DATA | | |

AUDIO LABEL / SUB-LABEL

FIG. 3D

| | 0 | 1 | 2 | 3 |
|---|---|---|---|---|
| q1 | 0xCF | 0xD0 | ANCILLARY DATA | |
| q2 | 0xCF | 0xD0 | ANCILLARY DATA | |
| q3 | 0xCF | 0x48 | NO DATA | |
| q4 | 0xCF | 0x48 | NO DATA | |
| q5 | 0xCF | 0x48 | NO DATA | |
| q6 | 0xCF | 0x48 | NO DATA | |
| q7 | 0xCF | 0x48 | NO DATA | |
| q8 | 0xCF | 0x48 | NO DATA | |

AUDIO LABEL / SUB-LABEL

FIG. 3E

| | 0 | 1 | 2 | 3 (BYTE) |
|---|---|---|---|---|
| q1 | 0xD1 | 0x00 | ANCILLARY DATA | |
| q2 | 0x50 | CHANNEL 1 AUDIO DATA | | |
| q3 | 0x51 | CHANNEL 2 AUDIO DATA | | |
| q4 | 0x51 | CHANNEL 3 AUDIO DATA | | |
| q5 | 0x51 | CHANNEL 4 AUDIO DATA | | |
| q6 | 0x51 | CHANNEL 5 AUDIO DATA | | |
| q7 | 0x51 | CHANNEL 6 AUDIO DATA | | |
| q8 | 0xCF | NO DATA | | |

AUDIO LABEL / SUB-LABEL

FIG. 3F

| | 0 | 1 | 2 | 3 |
|---|---|---|---|---|
| q1 | 0xCF | 0xD1 | NO DATA | |
| q2 | 0xCF | 0x50 | NO DATA | |
| q3 | 0xCF | 0x51 | NO DATA | |
| q4 | 0xCF | 0x51 | NO DATA | |
| q5 | 0xCF | 0x51 | NO DATA | |
| q6 | 0xCF | 0x51 | NO DATA | |
| q7 | 0xCF | 0x51 | NO DATA | |
| q8 | 0xCF | 0xCF | NO DATA | |

AUDIO LABEL / SUB-LABEL

FIG. 4

| LABEL VALUE | KIND |
|---|---|
| 0x00-0x3F | IEC60958 CONFORMANT FORMAT |
| 0x40-0x4F | MULTIBIT LINEAR AUDIO DATA |
| 0x50-0x57 | 1-BIT DIGITAL AUDIO DATA (PLANE) |
| 0x58-0x5F | 1-BIT DIGITAL AUDIO DATA (ENCODED) |
| 0x60-0x7F | - RESERVED - |
| 0x80-0x83 | MIDI CONFORMANT |
| 0x84-0x87 | EXPANDED MUSIC DATA |
| 0x88-0x8B | SMPTE TIME CODE CONFORMANT |
| 0x8C-0x8F | SAMPLE COUNT |
| 0x90-0xBF | - RESERVED - |
| 0xC0-0xEF | ANCILLARY DATA |
| 0xF0-0xFF | - RESERVED - |

F I G. 7
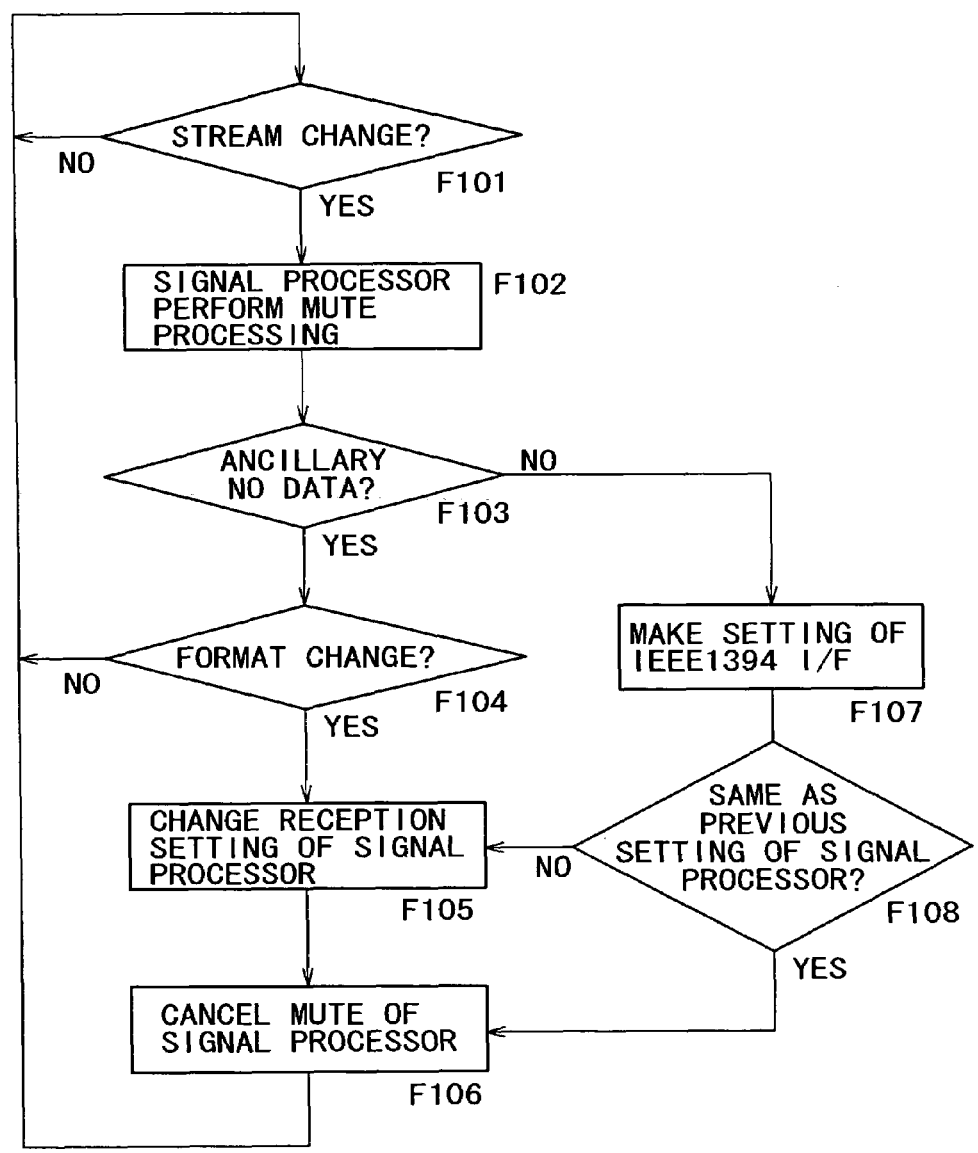

RECEPTION APPARATUS AND RECEPTION METHOD

TECHNICAL FIELD

The present invention relates to a receiving apparatus and a receiving method for use in a process of packetizing stream data such as audio data or the like and transmitting the packets.

BACKGROUND ART

It has been practiced in the art to transmit stream data such as audio data or the like between devices that are connected on interfaces according to the IEEE1394 standards.

For example, a disk reproducing device and an audio amplifier device will be considered below. Audio data are reproduced from a disk by the disk playback device and send via an IEEE1394 bus. The audio data are received by the audio amplifier device, which performs signal processing on the received audio data and reproduces and outputs the audio data.

At present, audio data are available in various types (data formats). Particularly, devices such as disk reproducing device or the like are designed so as to be compatible with many disks including CD (Compact Disc), MD (Mini Disc), DVD (Digital Versatile Disc), SACD (Super Audio Disc), etc.

A signal format for digital audio stream data in 2 channels R, L, such as on CDs and MDs, is called IEC60958.

A signal format for stream data on DVDs is called multibit linear audio.

A signal format for stream data on SACDs is called 1-bit digital audio (DSD: Direct Stream Digital).

1-bit digital audio data have been developed as higher-quality data than audio data on ordinary CDs, and include 1-bit data that have been ΔΣ-modulated using a very high sampling frequency of 2.842 MHz which 16 times the sampling frequency of 44.1 kHz for the CD format, for example. The 1-bit digital audio data have a frequency range from DC to 100 kHz and a dynamic range of 120 (dB) for the full audio band.

Though various other data formats are also present, the data in the above signal formats will be referred to as "IEC60958 data", "DVD data", and "SACD data".

For signals in the various signal formats for use on various media, there have been established Enhancement to Audio Music Data Transmission Protocol 2.0 (hereinafter referred to as AM824) standards for sending and receiving music data between interfaces according to the IEEE1394 standards. Depending on the various data formats, music data are packetized and transmitted over an IEEE1394 bus.

However, a device for receiving stream data transmitted over the IEEE1394 bus has no means for recognizing the format (data type) of the transmitted stream data, and hence is unable to know the format of the data unless it sees the contents of the data that have actually been received.

If the contents of the received data are actually checked, then a time is naturally required to check the data. When the received data are reproduced and outputted, therefore, the reproduced data may be interrupted in sound or interrupted at starting ends.

The above problem will be described below with reference to FIG. 8 of the accompanying drawings. FIG. 8 schematically shows the manner in which the receiving device operates. In FIG. 8, the received data include stream data that are packetized and sent from the originating device.

For the transmission over the IEEE1394 bus, invalid data streams are placed before and after the actual data stream. Ancillary no data represent such invalid data.

In FIG. 8, IEC60958 data are received as the received data up to time t1. Since ancillary no data each having a time length of about 10 msec., for example, are placed before and after the IEC60958 data, ancillary no data between times t1 and t2 in FIG. 8 are invalid data added to the trailing end of the IEC60958 data as real data. The ancillary no data are of an IEC60958 format.

After time t3, SACD data are received. Ancillary no data as invalid data are added before and after the SACD data as real data. Therefore, ancillary no data between times t2 and t3 in FIG. 8 are invalid data added to the leading end of the SACD data.

An IEEE1394 controller, an IEEE1394 interface (IEEE1394I/F), and a signal processor shown in FIG. 8 represent respective circuit portions in the receiving device.

The IEEE1394 interface serves as a receiver for receiving data from the IEEE1394 bus. The signal processor is a circuit portion for processing a signal received by the IEEE1394 interface and reproducing and outputting the processed signal. For example, the signal processed by the signal processor is outputted as sound from a speaker. The contents of the reproduced output are shown in a lowermost section in FIG. 8.

The IEEE1394 controller is a controller for controlling the IEEE1394 interface and the signal processor.

In FIG. 8, data in the IEC60958 format are received up to the time t2. The IEEE1394 interface and the signal processor are in a reception setting corresponding to the IEC60958 format.

Thereafter, the signal type (format) of received stream data is changed at time t2.

However, only the detection of ancillary no data is not enough to determine the format of next real data because it is not possible to determine whether the received ancillary no data are invalid data added before real data or invalid data added after real data.

Consequently, the reception setting of the IEEE1394 interface and the signal processor cannot be changed until time t3.

When SACD data are received as real data at time t3, the IEEE1394 controller confirms the contents of the data and recognizes that the signal type of the received stream data represents SACD data.

Based on the detection of the stream change, the reception setting of the IEEE1394 interface is changed to a reception setting corresponding to the SACD format, and the reception setting of the signal processor is also changed to a reception setting corresponding to the SACD format.

At the time the stream change is detected, the IEEE1394 controller controls the signal processor to operate in a mute mode, preventing the speaker from outputting noise.

After the reception setting of the IEEE1394 interface and the signal processor has been changed, the IEEE1394 controller controls the signal processor to cancel the mute mode. From this time on, the speaker outputs reproduced SACD sound.

It will be seen that after the actual SACD stream data are received, a period of time Tc needs to be consumed until the speaker outputs reproduced sound. The period of time Tc mainly serves as a period of time for changing the reception setting of the signal processor.

During the period of time Tc, the received SACD data are not reproduced and outputted, i.e., music data are interrupted at a starting end.

DISCLOSURE OF INVENTION

It is therefore an object of the present invention to be able to handle a change in a signal type upon data transmission as quickly as possible, minimizing the occurrence of an interruption of music data at a starting end.

A receiving apparatus according to the present invention includes receiving means for receiving a transmission signal of stream data, as converted to a predetermined packet configuration, transmitted selectively according to a plurality of predetermined signal types, the stream data including a real data stream and invalid data streams placed before and after the real data stream, signal processing means for processing the transmission signal received by the receiving means in a manner compatible with the stream data in the signal type thereof, and outputting the processing signal, and control means, responsive to the detection of a stream change to an invalid data stream of the transmission signal received by the receiving means, for controlling the signal processing means to have a setting compatible with the signal type of the invalid data stream, and, responsive to the detection of a stream change to a real data stream and the confirmation of the signal type of the real data stream, for controlling the receiving means to have a setting compatible with the signal type of the real data stream.

A receiving method according to the present invention includes the steps of receiving a transmission signal of stream data, as converted to a predetermined packet configuration, transmitted selectively according to a plurality of predetermined signal types, the stream data including a real data stream and invalid data streams placed before and after the real data stream, processing the received transmission signal in a manner compatible with the stream data in the signal type thereof, and outputting the processing signal, responsive to the detection of a stream change to an invalid data stream of the received transmission signal, controlling the step of processing the received transmission signal to have a setting compatible with the signal type of the invalid data stream, and responsive to the detection of a stream change to a real data stream of the received transmission signal and the confirmation of the signal type of the real data stream, controlling the step of receiving the transmission signal have a setting compatible with the signal type of the real data stream.

With the present invention as described above, responsive to the detection of a stream change to an invalid data stream (ancillary no data), the signal processing means is controlled to have a setting compatible with the signal type of the invalid data stream, i.e., to have its setting predictively changed to a setting compatible with the signal type of real data to arrive next. When a stream change to a real data stream is actually detected, the receiving means is controlled to have a setting compatible with the signal type of the real data stream. The changing of the setting of the signal processing means which is relatively time-consuming is predictively performed within an ancillary no data period. Therefore, after the stream change to the real data stream, only the setting of the receiving means needs to be changed, thus minimizing a period of time required to output the signal.

BRIEF DESCRIPTION OF DRAWINGS

FIGS. 3A through 3F are diagrams showing data sections of isochronous packets according to IEEE1394;

FIG. 4 is diagram showing labels of packet data;

FIG. 7 is a flowchart of the process for handling a change in a signal type which is carried out by the multiformat-compatible receiver according to the embodiment.

BEST MODE FOR CARRYING OUT THE INVENTION

An embodiment of the present invention will be described below. A receiving apparatus and a receiving method according to the embodiment of the present invention are embodied in a multiformat-compatible receiver, which is connected to a multiformat-compatible transmitter by an IEEE1394 bus for receiving data in various signal types (formats). The description will be given in the following sequence:

1. Transmission format of IEEE1394;
2. Apparatus arrangement; and
3. Process for handling a change in a signal type of stream data.

1. Transmission Format of IEEE1394:

First, the transmission format of IEEE1394 will be described below.

Figures 1A, 1B:
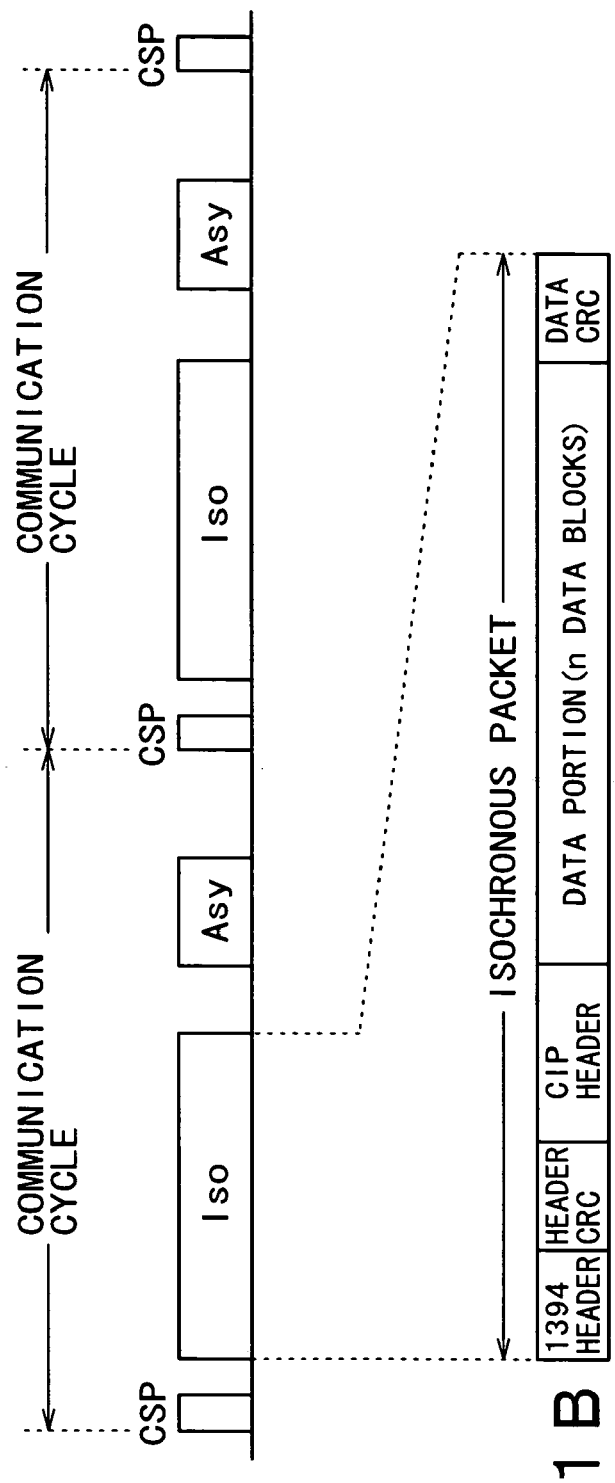
FIGS. 1A and 1B are diagrams showing a transmission format according to IEEE1394.

According to IEEE1394, data are transmitted by time-division multiplexing per predetermined communication cycle (e.g., 125 μsec. as shown in FIG. 1A. The signal transmission is started when a device called a cycle master (an arbitrary device on an IEEE1394 bus) sends a cycle start packet CSP indicative of the start of a communication cycle to the bus. The cycle master is automatically determined according a procedure provided for by IEEE1394 as when each device is connected to a cable that constitutes the bus.

Communication modes in one communication cycle include two types of transmission, i.e., an isochronous transmission (Iso) mode for transmitting real-time data such as video data, audio data, or the like, and an asynchronous transmission (Asy) mode for reliably transmitting control commands, auxiliary data, or the like.

In each cycle, an isochronous packet Iso for isochronous transmission is transmitted prior to an asynchronous packet Asy for asynchronous transmission.

After the transmission of the isochronous packet Iso, the period up to a next cycle start packet SCP is used to transmit the asynchronous packet Asy. Therefore, the period in which the asynchronous packet Asy can be transmitted varies depending on the number of transmission channels for the isochronous packet Iso. Since the isochronous packet Iso is transmitted by a process which keeps a band (the number of channels) reserved for each communication cycle, no confirmation from the receiving side is carried out.

When the asynchronous packet Asy is transmitted, acknowledgment (Ack) data is returned from the receiving side so that the asynchronous packet Asy can reliably be transmitted confirming its transmitted state.

FIG. 1B shows a structure of CIP (Common Isochronous Packet), i.e., a data structure of the isochronous packet Iso shown in FIG. 1A.

For example, the 1-bit digital audio data described above are sent and received in isochronous communications according to IEEE1394. That is, the amount of data that keeps their real-time properties is stored in the isochronous packet, and sent in each isochronous cycle.

As shown in FIG. 1B, the isochronous packet includes a 1394 packet header, a header CRC, a CIP header, a data section, and a data CRC.

Figure 2:
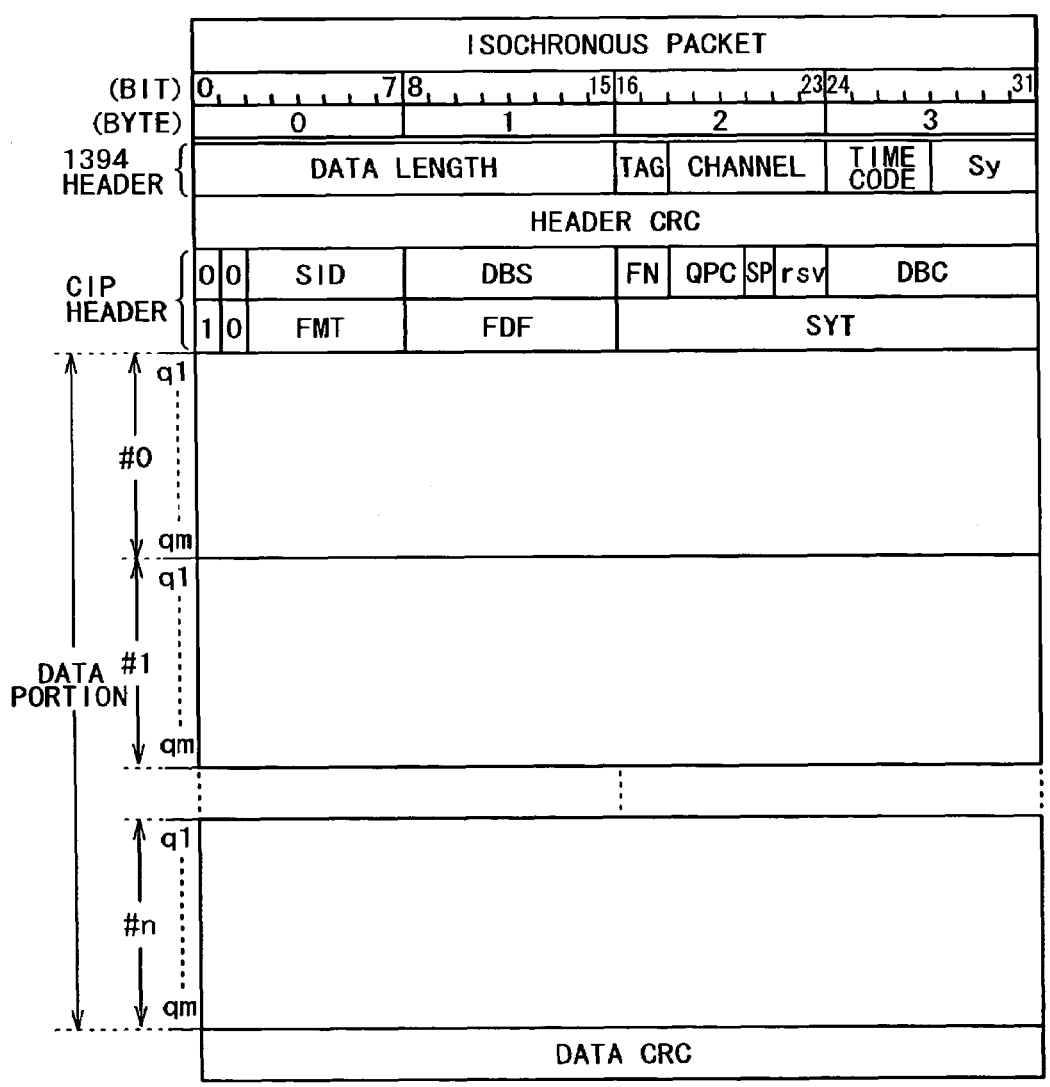
FIG. 2 is a diagram showing an isochronous packet according to IEEE1394.

A specific example of CIP structure for use in the transmission of 1-bit digital audio data in 2 channels, for example, is shown in FIG. 2.

FIG. 2 shows 32 bits (4 bytes) in the horizontal direction. One line of those data, i.e., 32 bits, is called one quadlet.

The first 32 bits (quadlet) of the CIP serve as the 1394 packet header.

The 1394 packet header is made up of a 16-bit data length (data_Length), a 2-bit tag (tag), a 6-bit channel (channel), a 4-bit time code (t code), and a 4-bit sync (sy).

The area of one quadlet following the 1394 packet header stores the header CRC.

The area of two quadlets following the header CRC serves as the CIP header.

The first 2 bits in the upper-level quadlet store "0", "0", respectively. The following area of 6 bits represents an SID (send node number). The area of 8 bits following SID represents a DBS (data block size) which indicates the size of a data block (a unit amount of packetized data). Then, the areas of FN (2 bits) and QPC (3 bits) are provided. FN represents the number of packets into which data are divided, and QPC represents the number of quadlets added for dividing the data.

SP (1 bit) represents a flag of the header of a source packet, and DBC represents the value of a counter for detecting a packet dropout.

In FIG. 2, "rsv" stands for reserved, i.e., it represents an undefined area.

The first 2 bits in the lower-level quadlet store "1", "0", respectively. They are followed by the areas of FMT (6 bits), FDF (8 bits), and SYT (16 bits).

FMT represents a signal format (transmission format). A data type (data format) stored in the CIP can be identified by a value indicated by FMT. Specifically, MPEG stream data, audio stream data, digital video camera (DV) stream data, etc. can be identified by a value indicated by FMT.

FDF refers to a format-depending field, and serves as an area for indicating a specific class of a data format that has been classified by FMT. If the data stored in the CIP are audio data, then FDF indicates whether the audio data are linear audio data or MIDI data.

If 1-bit digital audio data are stored in the CIP, then FMT indicates that they are in the category of audio stream data, and a particular value according to rules which is stored in FDF indicates that the audio stream data are 1-bit digital audio data.

SYT represents a time stamp for frame synchronization.

Following the CIP header, data indicated by FMT, FDF are stored as a sequence of n data blocks (block #0 to #n) in the data section. If 1-bit digital audio data are indicated by FMT, FDF, then the 1-bit digital audio data (DSD data) are stored in the area of data blocks.

The data blocks are followed by the data CRC.

Each of the data blocks (block #0-#n) contains a given number of quadlets q1-qm depending on the signal type of the data. m represents an even number, i.e., the number of quadlets of a data block is even.

The structure of the data section is produced based on a transmission protocol called AM824 that is applicable to the transmission of data via the IEEE1394.

FIGS. 3A through 3F show examples of structures of data blocks according to various formats.

FIGS. 3A and 3B show examples of structures of data blocks according to the IEC60958 format.

For transmitting audio data in 2 channels R and L as reproduced CD or MD data, a data block is made up of two quadlets q1 and q2 as shown in FIG. 3A, and such blocks are successively arranged as the data blocks (block #0 to #n) shown in FIG. 2.

In each of the data blocks according to various formats, the first byte of each quadlet (byte 0 in FIG. 2) is occasionally used as a label (audio label), and the second label (byte 1 in FIG. 2) is occasionally used as a sub-label.

The audio label represented by the first byte 0 in each quadlet serves as identifying information for the data provided in the quadlet.

Label values and their meanings are shown in FIG. 4.

As shown in FIG. 4, various meanings are defined for the label values. For example, the label values 0x00 to 0x3F correspond to an IEC60958 conformant format ("0x" indicates a hexadecimal number).

The label values 0x40 to 0x4F correspond to multibit linear audio data adopted by the DVD (Digital Versatile Disc) system.

The label values 0x50 to 0x57 are values corresponding to 1-bit digital audio data. The label values 0x58 to 0x5F are values corresponding to encoded 1-bit digital audio data. The label values 0x80 to 0x83 are values corresponding to MIDI data.

The label values 0xC0 to 0xEF mean ancillary data (auxiliary data). As described above, the various label values are defined so as to function as identifying information.

With the IEC60558 format shown in FIG. 3A, the audio label is either one of 0x00 to 0x3F, and no sub-label is employed. Audio data in the channel L are stored in three bytes, i.e., second through fourth bytes of the quadlet q1, and audio data in the channel R are stored in three bytes, i.e., second through fourth bytes of the quadlet q2.

FIG. 3B shows a data block for transmitting ancillary no data according to the IEC60958 format. The audio label of the quadlets q1 and q2 represents "0xCF", and the sub-label represents "0x00". No data (invalid data) are stored in two bytes, i.e., bytes 2 and 3.

The label value "0xCF" is a value in the category of ancillary data. However, this label value "0xCF" is particularly defined as a value indicative of invalid data (no data).

FIGS. 3C and 3D show data blocks for transmitting 6-channel data according to a multibit linear audio format such as the DVD audio format.

A data block is made up of eight quadlets q1 to q8 as shown in FIG. 3C, and such blocks are successively arranged as the data blocks (block #0 to #n) shown in FIG. 2.

With the multibit linear audio format shown in FIG. 3C, ancillary data are stored in bytes 2 and 3 in quadlets q1 and q2, so that the audio label of byte 0 represents "0xD0". The sub-label of byte 1 in quadlet q1 represents "0x01", and the sub-label of byte 1 in quadlet q2 represents "0x02".

The audio labels of quadlets q3 to q8 represent "0x48", with audio data in channels 1 to 6 stored in 3 bytes therein.

FIG. 3D shows a data block for transmitting ancillary no data according to the multibit linear audio data. The audio labels of quadlets q1 and q2 represent "0xCF", the sub-label "0xD0". Ancillary data are stored in two bytes, i.e., bytes 2 and 3.

In quadlets q3 to q8, the audio label represents "0xCF", and the sub-label "0x48", with no data (invalid data) stored in two bytes, i.e., bytes 2 and 3.

FIGS. 3E and 3F show data blocks for transmitting 6-channel data according to a 1-bit audio data (DSD data) format.

A data block is made up of eight quadlets q1 to q8 as shown in FIG. 3E, and such blocks are successively arranged as the data blocks (block #0 to #n) shown in FIG. 2.

With the 1-bit audio data format shown in FIG. 3E, the quadlet q1 has an audio label "0xD1" and a sub-label "0x00", with ancillary data stored in bytes 2 and 3.

The quadlets q2 to q7 have audio labels of "0x50", "0x51", with audio data in channels 1 to 6 stored in three bytes therein. The audio label "0x50" indicates the first quadlet of the data, and the audio label "0x51" indicates the second and following quadlets of the data.

The quadlet q8 has an audio label "0xCF" and a sub-label "0xCF", with no data stored in bytes 2 and 3. The quadlet of no data is added because the number of quadlets needs to be even.

FIG. 3F shows a data block for transmitting ancillary no data according to the 1-bit audio data format. The quadlet q1 has an audio label "0xCF" and a sub-label "0xD1".

The quadlet q2 has an audio label "0xCF" and a sub-label "0x50".

The quadlets q3 to q7 have an audio label "0xCF" and a sub-label "0x51".

The quadlet q8 has an audio label "0xCF" and a sub-label "0xCF".

No data are stored in two bytes, i.e., bytes 2 and 3, in each of the quadlets.

Each of the data blocks is constructed depending on each format, thus making up the data section in the isochronous packet Iso.

According to the above data block configuration, a device for receiving transmitted data can detect the format of the transmitted data by determining the label value.

Figure 5:
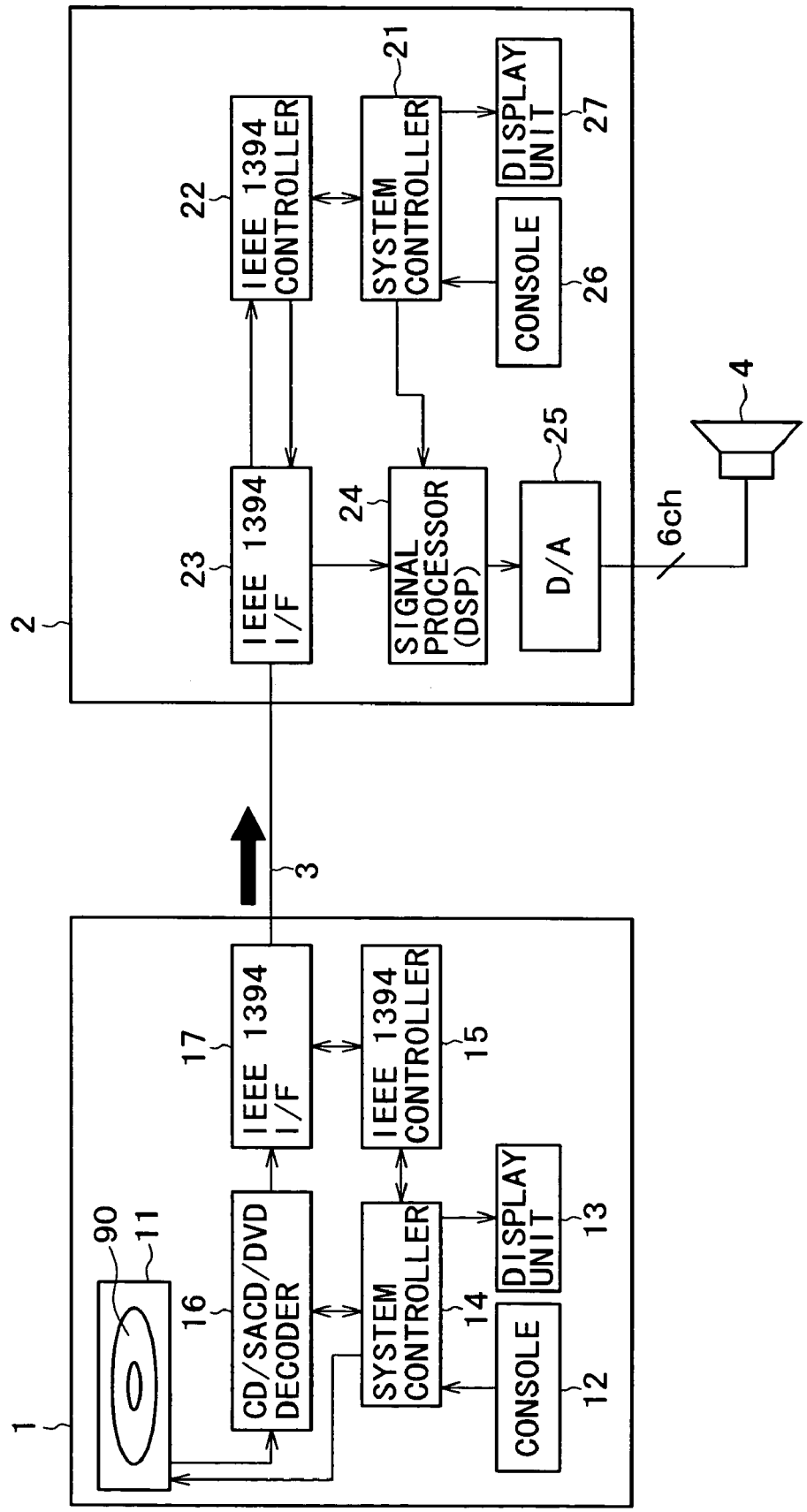
FIG. 5 is a block diagram of a multiformat-compatible transmitter and a multiformat-compatible receiver according to an embodiment of the present invention.

2. Apparatus Arrangement:

FIG. 5 shows a multiformat-compatible transmitter 1 and a multiformat-compatible receiver 2.

These two devices are connected to each other by a transmission path as an IEEE1394 bus 3, so that the multiformat-compatible transmitter 1 can send data such as music data or the like in the form of isochronous packets to the multiformat-compatible receiver 2.

Data according to the IEC60958 conformant format, data according to the SACD format as data according to the DSD format, and data according to the DVD audio format (multi-bit linear audio data) are sent from the multiformat-compatible transmitter 1 to the multiformat-compatible receiver 2.

The multiformat-compatible transmitter 1 has a function to reproduce a disc 90 as a recording medium that records audio data, etc. thereon.

A disc drive 11 reproduces various discs 90 such as CD/SACD/DVD. Specifically, the disc drive 11 has a spindle motor for rotating the disc 90, an optical head for reading information from the disc 90, a matrix amplifier for extracting a data signal, a servo signal, etc. from the information (reflected light information) read by the optical head, a two-axis mechanism, a sled mechanism, a servo circuit, a laser driver, etc. The disc drive 11 is controlled by a system controller 14 to reproduce the disc.

A decoder 16 decodes audio data reproduced from various discs 90 such as CD/SACD/DVD. The decoder 16 includes a DSP, for example.

The decoder 16 also extracts information such as sub-codes, addresses, etc., and supplies the extracted information to the system controller 14.

The audio data decoded by the decoder 16 is supplied to an IEEE1394 interface 17 (IEEE1394I/F).

The IEEE1394 interface 17 packetizes the supplied the audio data according to the IEEE1394 format, and sends the packets via the IEEE1394 bus 3 to external devices.

The system controller 14 includes a microcomputer having a CPU, a RAM, a ROM, etc., and controls overall operation of the multiformat-compatible transmitter 1. In particular, the system controller 14 controls accessing and reproducing operation of the disc drive 11, and decoding operation of the decoder 16.

The internal ROM of the system controller 14 stores a program for performing various operations of the multiformat-compatible transmitter 1. The internal RAM of the system controller 14 stores data and a program for the system controller 14 to carry out various operations.

For reproducing the disc 90, it is necessary to read management information, e.g., TOC or the like, which is recorded on the disc 90. The system controller 14 determines a disc type, the number of tracks recorded on the disc 90, and addresses of the tracks depending on the management information, and controls the reproducing of the disc 90 based on the read information. When the disc 90 is loaded into the disc drive 11, the system controller 14 reproduces the lead-in area of the disc 90 with TOC recorded thereon to read and extract the TOC. The system controller 14 then stores the TOC in the internal RAM thereof, so that the system controller 14 can refer to the TOC when the disc 90 will subsequently be reproduced.

A console 12 includes console keys disposed on a panel or the like of the multiformat-compatible transmitter 1, and serves as an area where the user enters control actions. Alternatively, the console 12 may include a receiver for detecting infrared radiation or the like and serve as an area for receiving control information from a so-called remote commander.

The control information of the user from the console 12 is supplied to the system controller 14. The system controller 14 executes various control operations to provide predetermined operations in response to the supplied control information.

The system controller 14 also controls display unit 13 to display the control information and predetermined contents depending on the present operation, for example.

For example, the display unit 13 displays various items of information including time information such as the total reproducing time of the disc, a time in program when the disk is reproduced or recorded, name information such as a track number, a disc name, a track name, etc., an operating state, an operation mode, etc.

An IEEE1394 controller 15 is connected to the system controller 14 for mutual communications.

The IEEE1394 controller 15 mainly controls the IEEE1394 interface 17 for controlling communicating operation of the IEEE1394 bus 3.

Although not described in detail here, the IEEE1394 controller 15 also operates to carry out authentication, generate a cryptokey, and send and receive commands and responses in the form of asynchronous packets for the transmission according to the IEEE1394 standards.

The multiformat-compatible receiver 2 includes a device for outputting, from a speaker 4, audio data that have been sent from the multiformat-compatible transmitter 1, for example.

The multiformat-compatible receiver 2 has an IEEE1394 interface 23 for sending data to and receiving data from other external devices via the IEEE1394 bus 3.

The IEEE1394 interface 23 demodulates a packets received via the IEEE1394 bus 3, and extracts data contained in the demodulated packet.

As the multiformat-compatible transmitter 1 can reproduce various data according to the IEC60958 format, the SACD format, and the DVD format, the IEEE1394 interface 23 can extract various data according to the IEC60958 format, the SACD format, and the DVD format from isochronous packets.

The audio data received and extracted by the IEEE1394 interface 23 are supplied to a signal processor 24. The signal processor 24 includes a DSP, for example, and performs various types of audio signal processing. For example, the signal processor 24 performs processing operations regarding a signal format, e.g., decoding and error correction, to convert data in each channel into linear PCM audio data, and also performs a sound field processing operation such as equalizing.

Digital audio data in a plurality of channels that have been produced by the signal processor 24 are converted by a D/A converter 25 into analog audio signals in the respective channels, amplified by an amplifier (not shown), and supplied to the speaker 4.

The speaker 4 includes a 6-channel speaker system for outputting sounds in a multichannel environment.

A system controller 21 includes a CPU (Central Processing Unit), a ROM, a RAM, and a flash memory, for example, and performs various operation control modes for the multiformat-compatible receiver 2 in its entirety.

The internal ROM stores a program for performing various operations of the multiformat-compatible receiver 2. The internal RAM stores data required for the system controller 21 to carry out various processing operations.

A console 26 includes console keys disposed on a panel or the like of the multiformat-compatible receiver 2, and serves as an area where the user enters control actions. Alternatively, the console 26 may include a receiver for detecting infrared radiation or the like and serve as an area for receiving control information from a so-called remote commander.

The control information of the user from the console 26 is supplied to the system controller 21. The system controller 21 executes various control operations to provide predetermined operations in response to the supplied control information.

The system controller 21 also controls display unit 27 to display the control information and predetermined contents depending on the present operation, for example.

In the present embodiment, the multiformat compatibility is given as compatibility with the IEC60958 format, the SACD format, and the DVD format. In order to be compatible with those formats, the reception setting of the IEEE1394 interface 23 and the signal processor 24 has to be changed depending on the format of the received data.

The system controller 21 controls switching between various parameters for changing the reception setting of the signal processor 24 depending on the determination of the format of the received data by an IEEE1394 controller 22.

During a period in which the format of the received data is not determined, the signal processor 24 performs a mute process on a sound signal supplied to the speaker 4 for preventing noise from being produced therefrom. The mute process is activated and canceled by the system controller 21.

The IEEE1394 controller 22 is connected to the system controller 21 for mutual communications.

The IEEE1394 controller 22 mainly controls the IEEE1394 interface 23 for controlling communicating operation of the IEEE1394 bus 3.

Although not described in detail here, the IEEE1394 controller 22 also operates to carry out authentication, generate a cryptokey, and send and receive commands and responses in the form of asynchronous packets for the transmission according to the IEEE1394 standards.

The IEEE1394 controller 22 also determines a data format and controls a reception setting as the multiformat-compatible receiver 2 receives data in the various formats.

As described above, audio stream data according to the IEC60958 format, the SACD format, and the DVD format are transmitted as packet data according to the AM824 standards. As described above with reference to FIGS. 3A through 3F, a signal type of the stream data can be determined by confirming the information of audio labels and sub-labels.

The information of audio labels and sub-labels is read into an internal register (CFR: Configuration Register) of the IEEE1394 interface 23 depending on the packet decoding process that is carried out by the IEEE1394 interface 23. The IEEE1394 controller 22 reads the data from the internal register CFR to determine a change in the stream data, a change in its format, and a new format type.

After having determined a stream change of the received data, the IEEE1394 controller 22 finalizes a new data format, and then controls the IEEE1394 interface 23 to change its reception setting. The IEEE1394 controller 22 also indicates to the system controller 21 depending on the format change, causing the system controller 21 to change the reception setting.

3. Process for Handling a Change in a Signal Type of Stream Data:

When the signal type of the stream data received by the IEEE1394 interface 23 has changed, the multiformat-compatible receiver 2 quickly responds to the change to change the reception setting of the IEEE1394 interface 23 and the signal processor 24.

Figure 6:
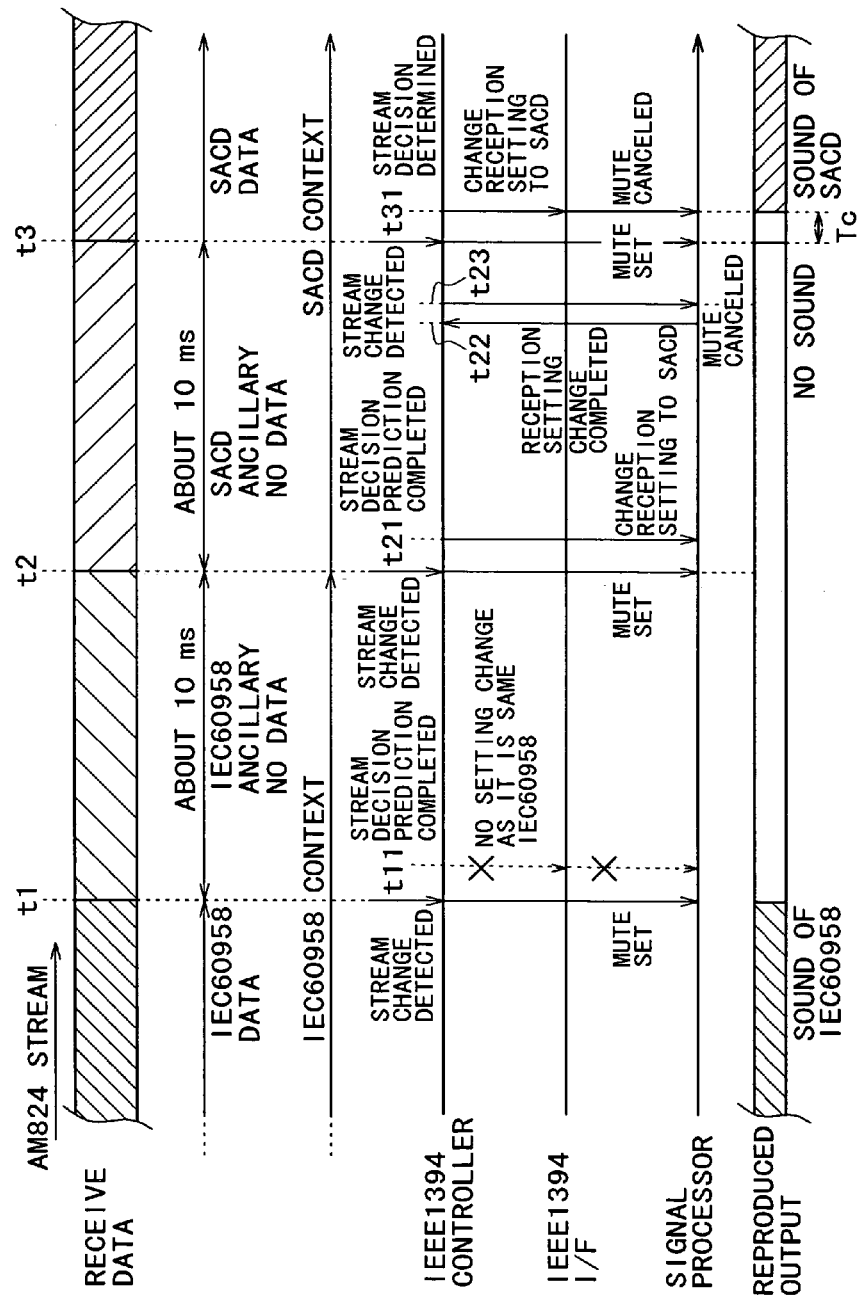
FIG. 6 is a diagram showing a process for handling a change in a signal type which is carried out by the multiformat-compatible receiver according to the embodiment.

Such operation of the multiformat-compatible receiver 2 is schematically shown in FIG. 6. First, a processing sequence of the IEEE1394 controller 22 for performing the operation shown in FIG. 6 will be described below with reference to FIG. 7.

In step F101, the IEEE1394 controller 22 detects whether there is a change in the data stream being received or not.

A change in the data stream is a change in the types shown in FIGS. 3A to 3F, for example. That is, a change in the data stream covers not only a change in the IEC60958 format, the SACD format, or the DVD format, but also a change to ancillary no data. (As described above, streams of ancillary no data are added before and after actual data.)

The IEEE1394 controller 22 detects a stream change based on a label or sub-label change.

If a stream change is detected in step F101, the control goes to step F102 in which the IEEE1394 controller 22 turns on the mute process of the signal processor 24. Specifically, the IEEE1394 controller 22 instructs the system controller 21 to carry out the mute process of the signal processor 24.

In step F103, the IEEE1394 controller 22 determines whether the new stream that has been changed is a stream of ancillary no data or not.

If the new stream is a stream of ancillary no data, then control goes to step F104 in which the IEEE1394 controller 22 determines whether there is a change in the format or not.

If it is judged that there is a format change, then the IEEE1394 controller 22 controls the signal processor 24 to change the reception setting in step F105. Specifically, the IEEE1394 controller 22 instructs the system controller 21 to change the reception setting of the signal processor 24 to a setting compatible with the new format.

In step F106, the IEEE1394 controller 22 cancels the mute mode of the signal processor 24.

If it is judged in step F103 the new stream is not a stream of ancillary no data, then the IEEE1394 controller 22 makes a reception setting of the IEEE1394 interface 23 in step F107. Specifically, if the new stream is a stream of real data as shown in FIG. 3A, 3C, or 3E, then the IEEE1394 controller 22 controls the IEEE1394 interface 23 to change the reception setting depending on the format of the real data.

In step F108, the IEEE1394 controller 22 determines whether there is a need for changing the reception setting of the signal processor 24 because of the present stream change or not. If there is such a need, then control goes to step F105. If there is no such a need, then the IEEE1394 controller 22 instructs the system controller 21 to cancels the mute mode in step F106.

The operation that is carried out by the processing sequence shown in FIG. 7 will be described below with reference to FIG. 6.

FIG. 6 shows operation of the IEEE1394 controller 22, the IEEE1394 interface 23, and the signal processor 24 depending on the state of the stream data that are received by the multiformat-compatible receiver 2.

The lowermost section of FIG. 6 shows reproduced contents of the output processed by the signal processor 24 which is outputted as sounds from the speaker 4.

As described above, when data are transmitted via the IEEE1394 bus, invalid data streams (ancillary no data) are provided before and after a real data stream such as audio data.

In FIG. 6, IEC60958 data are received as the received data up to time t1. Since ancillary no data each having a time length of about 10 msec., for example, are placed before and after the IEC60958 data, ancillary no data between times t1 and t2 in FIG. 6 are invalid data added to the trailing end of the IEC60958 data as real data. The ancillary no data are of an IEC60958 format.

At time t1, therefore, the stream of the data block shown in FIG. 3A has changed to the stream of the data block shown in FIG. 3B.

After time t3, SACD data are received. Ancillary data as invalid data are added before and after the SACD data as real data. Therefore, ancillary no data between times t2 and t3 in FIG. 6 are invalid data added to the leading end of the SACD data.

At time t3, therefore, the stream of the data block shown in FIG. 3F has changed to the stream of the data block shown in FIG. 3E.

At time t2, the ancillary no data according to the IEC60958 format shown in FIG. 3B has changed to the ancillary no data according to the SACD format shown in FIG. 3F.

Operation at each of the times will be described below. The processing sequence in FIG. 7 which corresponds to each operation is indicated by a step number.

First, operation at time t1 will be described below.

At time t1, the IEEE1394 controller 22 detects a change from the audio data according to the IEC60958 format to the ancillary no data according to the IEC60958 format (F101→F102).

The signal processor 24 is controlled to perform the mute process (F102).

At time t11 immediately after time 1, the format of a next real data stream is predicted from the new stream upon the stream change.

Though the new stream upon the stream change is ancillary no data, there is no change in the format. This means that a format change is not predicted, and hence no control is performed to change the reception setting (F103→F104→F101).

At time t2, a stream change is detected again (F101→F102).

The signal processor 24 is controlled again to perform the mute process (F102).

The new stream upon the stream change is also ancillary no data as with the preceding stream. In this case, however, the IEC60958 format has changed to the SACD format. Since this change predicts that the format of a next real data stream will be the SACD format, the IEEE1394 controller 22 controls the signal processor 24 to change the reception setting to a setting compatible with the SACD format at time t21 (F103→F104→F105).

The signal processor 24 changes parameters. When the changing of the reception setting of the signal processor 24 is detected as being completed at time t22, the IEEE1394 controller 22 controls the signal processor 24 to cancel the mute process at time t23 (F106). Since the data stream is the ancillary no data at this time, no actual sounds are outputted even when the mute process is canceled.

At time t3, the IEEE1394 controller 22 also detects a stream change (F101→F102).

The signal processor 24 is controlled again to perform the mute process (F102).

The new stream is the audio data according to the SACD format as with the preceding ancillary no data. In this case, real data according to the SACD format are confirmed at time t31, and the IEEE1394 controller 22 controls the IEEE1394 interface 23 to change the reception setting to a setting compatible with the SACD format (F103→F107).

Since the reception setting of the signal processor 24 has already been changed to the setting compatible with the SACD format, not control is required to change the reception setting of the signal processor 24, and the mute process thereof is canceled ((F107→F108→F106).

The speaker 4 now outputs sounds reproduced from the disc 90 which is an SACD.

As can be seen from the above operation, during a period which ancillary no data with a format change detected is transmitted, the format of next real data is predicted, and the reception setting of the signal processor 24 is changed in advance. When the next real data actually start being received and the format of the real data is confirmed, the reception setting of the IEEE1394 interface 23 is changed.

Figure 8:
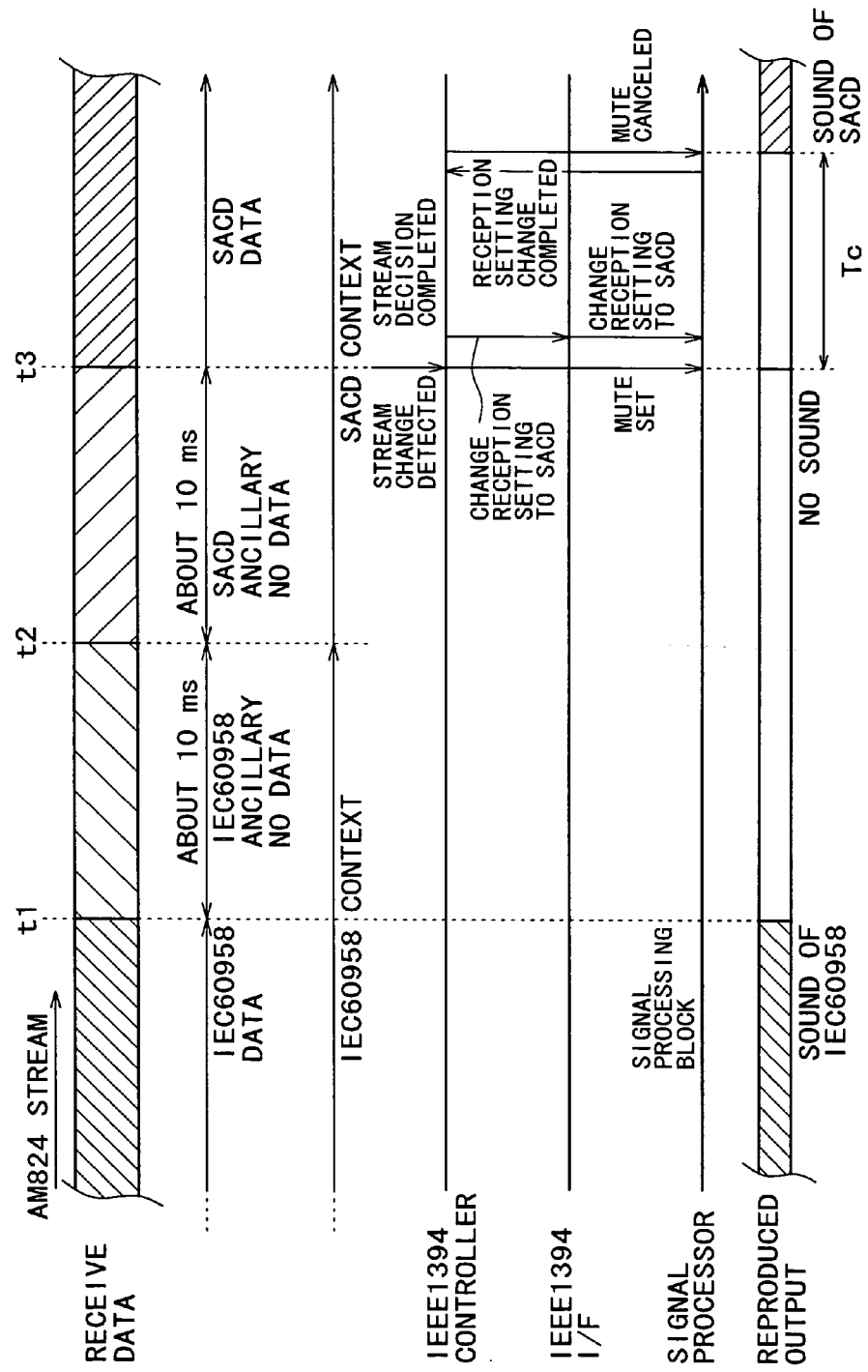
FIG. 8 is a diagram showing a conventional process for handling a change in a signal type.

According to the above operation, the reception setting of the signal processor 24 does not need to be changed after the time when the real data start being received, and the period of time after the SACD stream data are actually received and the sounds are outputted from the speaker can greatly be reduced as indicated as a time Tc in FIG. 6. A comparison with FIG. 8 clearly shows that the time Tc is greatly shortened.

By shortening the time Tc by predictively making a change in the reception setting of the signal processor 24 which is relatively time-consuming, almost all interruptions at starting ends of reproduced music pieces are practically eliminated.

While the embodiment of the present invention has been described above, the present invention may be embodied in various many arrangements. For example, though the multiformat-compatible receiver 2 is arranged to output received audio data through the speaker 4 in the illustrated embodiment, the multiformat-compatible receiver 2 may be arranged to have a recorder for recording received data on a recording medium.

The three formats, i.e., the IEC60958 format, the SACD format, and the DVD format, have been described above as formats (signal types). However, the present invention is also applicable to devices compatible with the transmission of signals according to other formats.

INDUSTRIAL APPLICABILITY

According to the present invention, as described above, depending on a stream change to an invalid data stream (ancillary no data), the signal processing means is controlled to change its setting compatible with the signal type of the invalid data stream, i.e., to predictively change its setting to the signal type of real data that are to arrive next. When a stream change to a real data stream is actually detected, the receiving means is controlled to change its setting compatible with the signal type of the real data stream. By thus changing the setting, the changing of the setting of the signal processing means which is relatively time-consuming can predictively be carried out within an ancillary no data period. Therefore, after the stream change to the real data stream, only the setting of the receiving means needs to be changed, thus minimizing a period of time required to handle the change in the signal type in the receiving apparatus. If the receiving apparatus is a device for outputting received audio stream data through a speaker or the like, any interruptions at starting ends of sounds are minimized, and the capabilities of the device can be increased.

The invention claimed is:

1. A receiving apparatus comprising:
   receiving means for receiving a transmission signal of stream data, as converted to a predetermined packet configuration, transmitted selectively according to a plurality of predetermined signal types including a first signal type, the stream data including a real data stream and invalid data streams placed before and after the real data stream;

signal processing means for processing the transmission signal received means in a manner compatible with the stream data in a signal type of the stream data, and for outputting the processing signal; and control means, responsive to the detection of a stream change in the transmission signal received by said receiving means to an invalid data stream of the first signal type, for controlling said signal processing means to have a setting compatible with the first signal type and, responsive to the detection of a stream change to a real data stream and a conformation that the real data stream is of the first signal type, for controlling said receiving means to have a setting compatible with the first signal type of said real data stream.

2. A receiving method comprising the steps of:
   receiving a transmission signal of stream data, as converted to a predetermined packet configuration, transmitted selectively according to a plurality of predetermined signal types including first signal type, the stream data including a real data stream and invalid data streams placed before and after the real data stream;

processing the received transmission signal in a manner compatible with the stream data in a signal type of the stream data; and outputting the processing signal;

responsive to the detection of a stream change in the transmission signal to an invalid data stream of the first type, controlling the processing of the received transmission signal to have a setting compatible with the first signal type; and responsive to the detection of a stream change to a real data stream of the received transmission signal and a conformation that the real data stream is of the first signal type, controlling the receiving of the transmission signal to have a setting compatible with the first signal type of said real data stream.

* * * * *